US 6,542,390 B2

(12) United States Patent
Bixel

(10) Patent No.: US 6,542,390 B2
(45) Date of Patent: Apr. 1, 2003

(54) SYSTEM AND METHOD FOR REGENERATIVE PWM AC POWER CONVERSION

(75) Inventor: Paul S. Bixel, Salem, VA (US)

(73) Assignee: General Electric Company, Schenectady, NY (US)

(*) Notice: Subject to any disclaimer, the term of this patent is extended or adjusted under 35 U.S.C. 154(b) by 25 days.

(21) Appl. No.: 09/683,422

(22) Filed: Dec. 27, 2001

(65) Prior Publication Data
US 2002/0085398 A1 Jul. 4, 2002

Related U.S. Application Data
(60) Provisional application No. 60/258,820, filed on Jan. 2, 2001.

(51) Int. Cl.$^7$ ................................................. H02M 7/00
(52) U.S. Cl. ............................... 363/71; 363/67; 363/68
(58) Field of Search ............................. 363/71, 65, 70, 363/67, 68

(56) References Cited

U.S. PATENT DOCUMENTS

| | | | |
|---|---|---|---|
| 5,625,545 A | 4/1997 | Hammond | 363/71 |
| 5,638,262 A | 6/1997 | Brown | 363/95 |
| 5,638,263 A * | 6/1997 | Opal et al. | 363/65 |
| 5,757,627 A | 5/1998 | Faulk | 363/97 |
| 5,764,499 A | 6/1998 | Klug et al. | 363/39 |
| 5,886,888 A | 3/1999 | Akamatsu et al. | 363/65 |
| 5,898,577 A | 4/1999 | Tomiyama | 363/19 |
| 5,905,642 A | 5/1999 | Hammond | 363/37 |
| 5,933,339 A | 8/1999 | Duba et al. | 363/71 |
| 5,986,909 A | 11/1999 | Hammond et al. | 363/65 |
| 6,005,788 A | 12/1999 | Lipo et al. | 363/71 |
| 6,013,991 A | 1/2000 | Philipp | 318/139 |
| 6,014,323 A | 1/2000 | Aiello et al. | 363/71 |
| 6,069,802 A | 5/2000 | Priegnitz | 363/97 |
| 6,072,707 A | 6/2000 | Hochgraf | 363/71 |
| 6,229,722 B1 * | 5/2001 | Ichikawa et al. | 363/71 |

* cited by examiner

Primary Examiner—Bao Q. Vu
(74) Attorney, Agent, or Firm—Hunton & Williams

(57) ABSTRACT

A power conversion system for driving a load is provided. The power conversion system comprises a power transformer having at least one primary winding circuit and at least one secondary winding circuit, the primary winding circuit being electrically connectable to an AC power source. The system further comprises at least one power cell, each of the at least one power cell having a power cell input connected to a respective one of the at least one secondary winding circuit. Each power cell also has a single phase output connectable to the load. An SCR arrangement including a gate drive and at least one SCR is connected to the power cell input and a DC bus. An SCR controller is connected to the SCR arrangement and the power cell input. The power cell also has a PWM output stage having a plurality of PWM switches connected to the DC bus and the single phase output. A local modulation controller is connected to the PWM output stage. The SCR arrangement and the SCR controller are configured for controlling a DC bus voltage, the PWM switches are configured for controlling power flow to the single phase output, and the local modulation controller is configured for controlling activation of the PWM power switches. The power conversion system further comprises a master controller in communication with the SCR controller and the local modulation controller of each of the at least one power cell. The master controller is connectable to the load to monitor power flow thereto.

28 Claims, 5 Drawing Sheets

SYSTEM AND METHOD FOR REGENERATIVE PWM AC POWER CONVERSION

BACKGROUND OF THE INVENTION

The present application derives priority from U.S. Prov. application Ser. No. 60/258,820, filed Jan. 2, 2001 which is incorporated herein by reference in its entirety.

The present invention relates generally to controlling or driving alternating current (AC) motors. More particularly, the present invention relates to a method and apparatus for providing regenerative control of AC motors.

A wide variety of AC medium-voltage variable speed drives for induction motors are known which use a variation of current source topology with a phase-controlled silicon controlled rectifier (SCR) input stage and a 6-pulse or 12-pulse output. This topology may sometimes have the drawbacks of harmonic line currents, a variable power factor, and motor torque pulsations. These traits are especially problematic at higher power levels typical for medium voltage motor drives. Because of these and other disadvantages of the current source topology, pulse width modulated (PWM) circuits are preferred to provide motor control. Pulse width modulation is a form of modulation in which the value of each instantaneous sample of the modulating wave is caused to modulate the duration of a pulse. In PWM, the modulating wave may vary the time of occurrence of the leading edge, the trailing edge, or both edges of the pulse. The modulating frequency may be fixed or variable.

In a PWM circuit, a reference signal may be used to generate a train of pulses, the width of each pulse being related to the instantaneous value of the reference signal. The pulses may be generated by using a comparator to compare the reference signal with a carrier signal, which may be a saw tooth or triangular wave. When the reference signal exceeds the carrier signal, the output of the comparator is high; at other times, the output of the comparator is low. The comparator output does provide a train of pulses representing the reference signal. The pulses are then used to drive an electronic switching device for intermittently applying a voltage across the load.

U.S. Pat. No. 5,625,545, (hereinafter, the '545 patent) discloses a medium voltage PWM drive and method suitable for controlling medium voltage AC motors, in which a multi-phase power transformer having multiple secondary windings provides multi-phase power to each of a plurality of power cells. Each power cell has a single-phase output and is controlled by a modulation controller. Because the power cells are connected in series, the maximum output voltage for each cell may be less than the maximum line-to-line voltage.

Each power cell of the drive disclosed in the '545 patent may contain an AC-to-DC input rectifier, a smoothing filter, an output single phase DC-to-AC converter, and a control circuit. The input rectifier comprises a diode bridge that accepts three-phase AC input from a secondary winding circuit of the power transformer. The input Arectifier transforms three-phase AC power into DC power that may have significant ripple. To ameliorate the effects of such ripple, a smoothing filter composed of electrolytic capacitors is connected to the DC side of the input rectifier. The smoothing filter also connects to the output converter. The output converter comprises a single-phase H-bridge of power transistors, such as, for example, insulated gate bipolar transistors (IGBTs). Each transistor of the output converter is operable by a local modulation control circuit. Signals for controlling the local modulation control circuit are provided by a master modulation controller. This allows the control of the power contribution of the power cell to the overall power supplied to the load.

As exemplified by the drive disclosed in the '545 patent, it is possible to produce a medium-voltage controller with low-voltage power cells by connecting multiple cells in series on each phase output line. Serial connection of cells makes multiple voltage states per phase possible; these multiple voltage states per phase may be used to obtain improved waveforms.

The pulse-width modulation technique of the '545 patent allows selective control of the duration and frequency of power cell pulse outputs. This method can use control signals, based upon interdigitated carrier signals, to selectively cause a switching event in a particular power cell. Typically, switching events are sequenced such that a switching event occurs in only one power cell at a time.

The techniques disclosed in the '545 patent are limited in that they provide a motor drive that cannot be used in a regenerative operation mode; i.e., a mode in which power flows from the motor through the drive to the transformer. A non-regenerative operation (or motoring) mode is operation in which power is supplied by the transformer through the drive to the motor. The master modulation controller in the '545 patent must carefully monitor the power flow in the system to avoid any situation in which power would flow from the motor into the drive. Failure to control the power flow would lead to an overvoltage situation developing within the power cell since the power cell has no means to dispose of power from the motor. The internal diode rectifier does not permit power to flow back to the AC mains connected to the drive. This effectively prevents the use of the drive in a regenerative mode.

SUMMARY OF THE INVENTION

An aspect of the present invention provides a power conversion system for driving a load. The power conversion system comprises a power transformer having at least one primary winding circuit and at least one secondary winding circuit, the primary winding circuit being electrically connectable to an AC power source. The system further comprises at least one power cell, each of the at least one power cell having a power cell input connected to a respective one of the at least one secondary winding circuit. Each power cell also has a single phase output connectable to the load. An SCR arrangement including a gate drive and at least one SCR is connected to the power cell input and a DC bus. An SCR controller is connected to the SCR arrangement and the power cell input. The power cell also has a PWM output stage having a plurality of PWM switches connected to the DC bus and the single phase output. A local modulation controller is connected to the PWM output stage. The SCR arrangement and the SCR controller are configured for controlling a DC bus voltage, the PWM switches are configured for controlling power flow to the single phase output, and the local modulation controller is configured for controlling activation of the PWM power switches. The power conversion system further comprises a master controller in communication with the SCR controller and the local modulation controller of each of the at least one power cell. The master controller is connectable to the load to monitor power flow thereto.

Other objects and advantages of the invention will be apparent to one of ordinary skill in the art upon reviewing the detailed description of the invention.

BRIEF DESCRIPTION OF THE DRAWINGS

The features and advantages of the present invention will be understood more clearly upon reading the following Detailed Description of exemplary embodiments in conjunction with the accompanying drawings, in which.

DETAILED DESCRIPTION OF THE INVENTION

The present invention provides a multiphase AC power conversion methodology for use in power conversion systems configured for driving an AC motor. The power conversion methodology uses power conversion cells that may be configured to operate in both motoring and regenerative operation modes. In addition to the power cells, the power conversion systems of the invention comprise a multiphase transformer configured to supply multiphase power to each power cell. The transformer may comprise one or more primary windings driving a plurality of secondary windings, each secondary winding being used to power a single power cell, which, in turn, provides single phase AC power to a load such as an AC motor. Multiple power cells having the same output phase may be connected in series to achieve the desired voltage level to be supplied to the load. The voltage provided by each power cell may be controlled using a modulation controller that is connected to each of the power cells.

The power cells are configured with a rectifying input stage comprising an SCR arrangement having a plurality of forward conducting SCRs for controlling power flow in the transformer to motor direction and a plurality of backward conducting SCRs for controlling power flow in the motor to transformer direction. The SCRs control the DC bus voltage in the power cell. The power cells also include a pulse width modulation (PWM) output stage that controls the output to the motor when the power conversion system is in motoring mode. Each power cell may also include a smoothing capacitor disposed between the SCR arrangement and the PWM output stage.

The power cells of the power conversion system of the invention also include an SCR controller that may be configured and operated according to a number of control methodologies.

Figure 1:
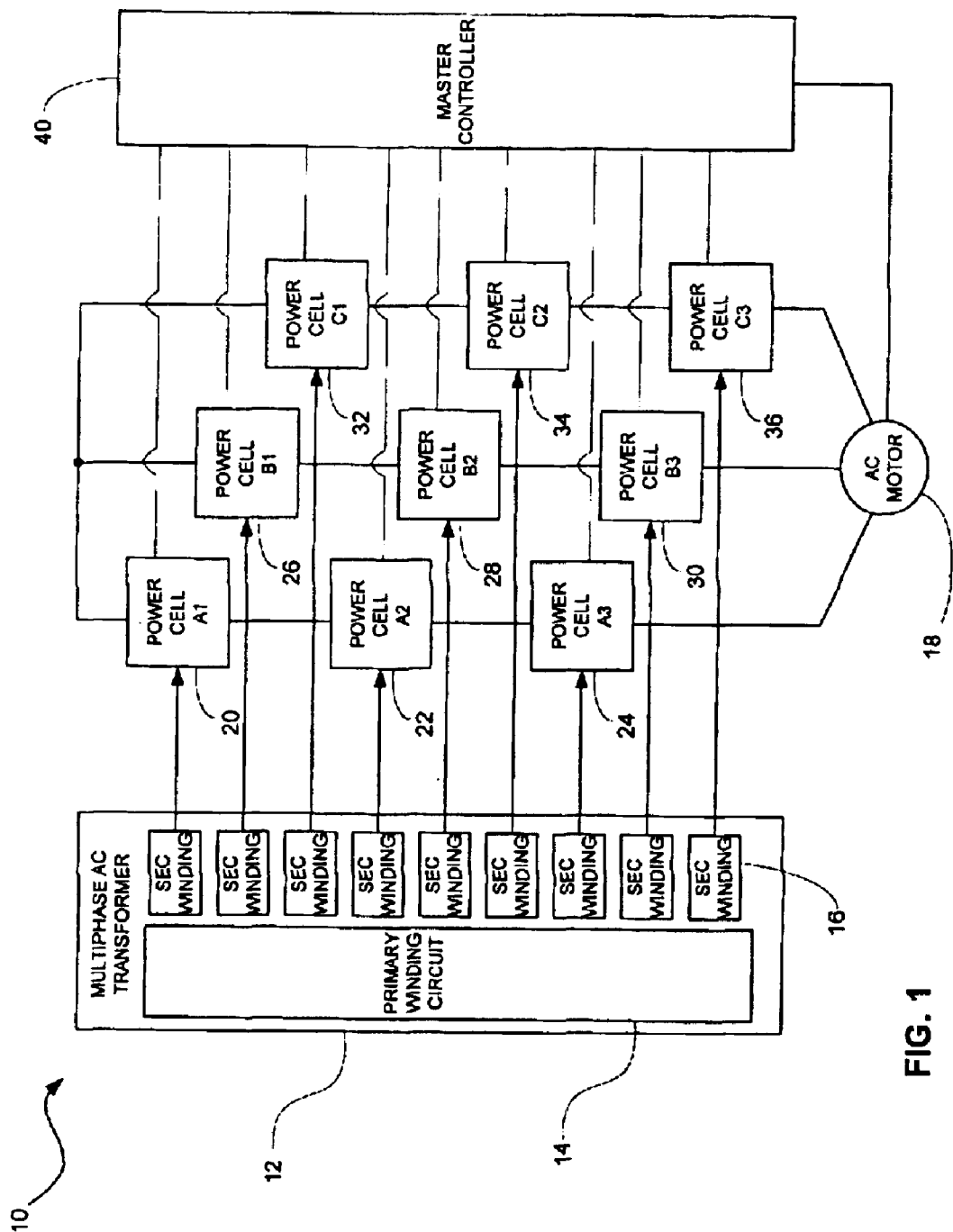
FIG. 1 is a diagram of a topology for a motor drive in which power cells according to embodiments of the invention may be used.

With reference to the drawings, the invention will now be discussed in more detail. FIG. 1 illustrates an exemplary embodiment of a power conversion system 10 according to the invention. The power conversion system 10 comprises a multi-phase AC power transformer 12 that provides multiphase power to each of a plurality of power cells 20, 22, 24, 26, 28, 30, 32, 34, 36. Each power cell converts the multiphase input power to a conditioned, single phase output, which is supplied to an AC motor 18. Embodiments of the invention may also be used to supply power to a DC motor or any other load.

Illustratively, the power transformer 12 may include a primary winding circuit 14 that is powered by a three-phase AC power source (not shown). The primary winding circuit 14, which may be star-or mesh-connected, may be used to energize a plurality of three-phase secondary winding circuits 16. The secondary winding circuits 16 may be mesh-connected or star-connected to lower the supply transformer's K-factor and to improve harmonics control. Mesh-connected windings may include, for example, delta or extended delta configurations. Star-connected windings may include, for example, wye or zig zag configurations. Under certain circumstances, the secondary windings 16 may be manipulated to advance some of the secondary windings 16 by preselected degrees of electrical phase and to retard other secondary windings 16 by preselected degrees of electrical phase. Some of the secondary windings 16 may remain substantially unshifted in phase.

It will be understood by those having ordinary skill in the art that other transformer configurations capable of providing multiphase power to the power cells may also be used in the present invention. It will also be understood that single phase secondary windings may be used in the transformer 12.

In the power conversion system 10 shown in FIG. 1, power cells A1, A2, and A3 (ref. nos. 20, 22 and 24, respectively) each provide output power having phase A. Power cells B1, B2, and B3 (ref. nos. 26, 28 and 30, respectively) each provide output power having phase B. Power cells C1, C2, and C3 (ref. nos. 32, 34 and 36, respectively) each provide output power having phase C. As shown, power cells providing the same output phase may be connected in series on a common output line. This makes it possible to produce a medium-voltage phase line input to the AC motor using a plurality of low-voltage power cells. Each power cell may therefore be constructed internally to low-voltage standards. For example, each power cell may have a 600- volts rating, despite its inclusion in a medium-voltage apparatus. Serial connections also make multiple voltage states per phase possible. These multiple voltage states per phase may be used to obtain improved current waveforms. In such an embodiment, the individual power cells may be isolated from ground, and other power cells, using insulation suitable for the medium voltage level being used.

In the power conversion system 10 illustrated in FIG. 1, three power cells are provided per phase output line. Due to the serial connection between three of the power cells in each phase output line (e.g., power cells A1, A2 and A3 in the phase A output line) it is possible to produce a maximum output voltage magnitude of about 1800 VDC above neutral using power cells rated at 600 volts. As will be discussed in more detail hereafter, the output of each power cell may be separately controlled to provide any voltage level below its upper limit. Thus, the output line voltage for each phase can be separately controlled to provide an output of any level between 0 and 1800 VDC.

In other embodiments, circuits using greater or fewer than three power cells per phase may be used to satisfy the voltage requirements of the inductive motor load. For example, in one embodiment which can be applied to 2300 VAC inductive motor loads, three power cells are used for each of the three phase output lines. However, in another embodiment, which may be applied to a 4160 VAC inductive motor load, five power cells may be used for each of the three phase output lines.

Individual and collective control of the power cells of the power conversion system 10 is provided by a master controller 40, which is in communication with each power cell. The master controller 40 monitors the power flow to and output of the AC motor 18. As will be discussed in more detail hereafter, the master controller 40 controls the output of each power cell and may be used to control changes in operating mode of the power conversion system 10.

Figure 2:
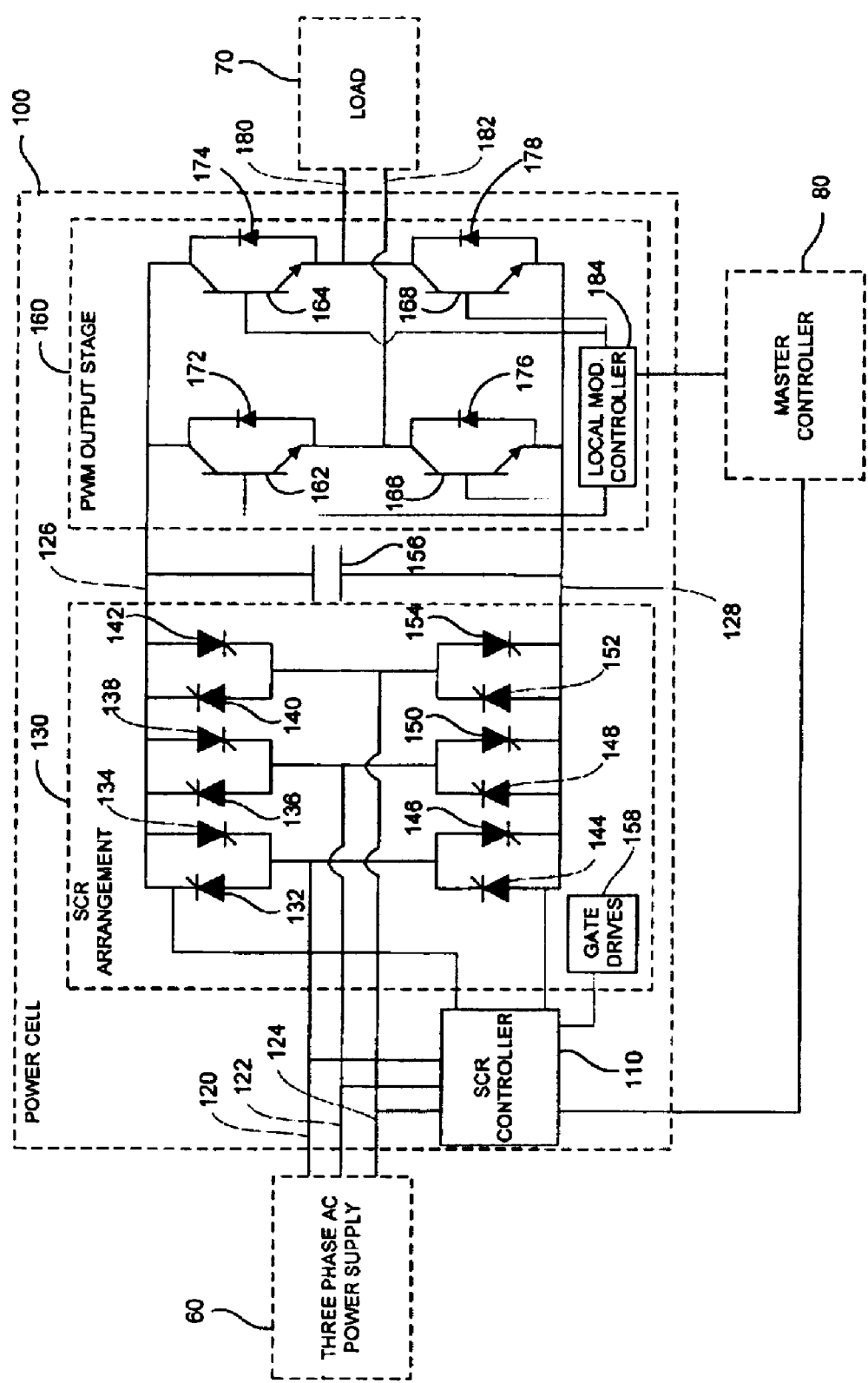
FIG. 2 is a diagram of a power cell topology according to an embodiment of the invention.

A power cell 100 according to an illustrative embodiment of the present invention is illustrated in FIG. 2. In a motoring mode, the power cell 100 receives three phase AC power from a power supply 60 that may be the secondary windings of a power transformer such as the multiphase AC power transformer 12 of the power conversion system 10 of FIG. 1. The three-phase AC power is received via three separate phase lines 120, 122, 124. The power cell 100 converts the three-phase AC power into filtered DC power using a 3-phase SCR arrangement 130 and a smoothing capacitor 156. The filtered DC power is then supplied to a load 70 using a pulse width modulation (PWM) output stage 160. The load 70 may be an AC motor such as the motor 14 of FIG. 1, a DC motor or any other load that may operate in either a power receiving or power supplying mode. In a regenerative mode, the power cell 100 receives power from the load (motor) 70 and passes it back to the power supply 60 via the SCR arrangement 130. The SCR arrangement 130 operates in a DC bus voltage regulation mode such that when the DC voltage rises beyond a predetermined threshold, SCRs in the SCR arrangement are gated to reduce the DC bus voltage.

In accordance with an aspect of the present invention, the SCR arrangement 130 may include a set of twelve SCRs in a bridge arrangement to control the DC bus voltage, which is defined as the voltage between the first and second bus lines 126, 128. The SCR arrangement 130 includes a first set six of SCRs 132, 134, 136, 138, 140, 142 connected in parallel with a second set of six SCRs 144, 146, 148, 150, 152, 154, the two sets being connected to the first and second bus lines 126, 128, respectively. Two opposing SCRs in each set are connected in parallel to each of the three phase lines 120, 122, 124. Thus, in the first set, two opposing SCRs 132, 134 are connected in parallel between the first phase line 120 and the first bus line 126, two opposing SCRs 136, 138 are connected in parallel between the second phase line 122 and the first bus line 126, and two opposing SCRs 140, 142 are connected in parallel between the third phase line 124 and the first bus line 126. Similarly, in the second set, two opposing SCRs 144, 146 are connected in parallel between the first phase line 120 and the second bus line 128, two opposing SCRs 148, 150 are connected in parallel between the second phase line 122 and the second bus line 128, and two opposing SCRs 152, 154 are connected in parallel between the third phase line 124 and the second bus line 128.

The power cell 100 may include an SCR controller 110 that is connected to the first and second bus lines 126, 128 and is capable of sensing a magnitude of the DC bus voltage. The SCR controller 110 provides signals to a gate drive module 158 that includes a gate drive for each of the SCRs in the SCR arrangement 130. The SCR controller 110 operates in a first DC bus voltage regulation mode such that when the DC voltage raises beyond a pre-determined threshold (e.g., 1% above a predetermined DC bus voltage value), the controller 110 commands the gate drive module 158 to apply gating voltages to the SCRs such that the DC bus voltage is reduced. This allows the power cell to maintain the DC bus voltage to a desired level. In addition to providing the capability to control the DC bus voltage, the SCR arrangement 130 also provides flexibility in that the SCRs may be gated to produce any voltage below their allowable limits. More detail on control methodologies are provided below.

As shown, the controller 110 may also be connected to the input phase lines 120, 122, 124 to sense the AC line voltage present in the input phase lines 120, 122, 124, and may be suitably configured and/or programmed to determine the phase of the input waveform. Based on this phase determination, the controller 110 can determine a phase advance for gating the SCRs. In one implementation, the SCR controller 110 monitors the AC waveform and uses the zero crossing (when the AC voltage reverses polarity) to determine a phase adjustment for firing or gating the SCRs. This input will be related to the current flow.

Importantly, the SCR arrangement 130 is configured to limit and control the DC bus voltage in both motoring and regenerative modes with all of the SCRs connected in one direction (forward-conducting SCRs 132, 136, 140, 144, 148, 152) controlling the DC bus voltage in the motoring mode and all of the SCRs connected in the opposing direction (reverse-conducting SCRs 134, 138, 142, 146, 150, 154) controlling the DC bus voltage in the regenerative mode.

In the motoring mode, the SCR arrangement 130 serves as a rectifier, converting the three phase AC input from the three phase lines 120, 122, 124 into a DC output. Rectification can produce both a DC current and ripple current. Single-phase H-bridge output converters can reflect a ripple current at twice the frequency of an AC motor being driven. The DC output currents of the SCR arrangement 130 generally will match the DC current of the output stage 160, but the instantaneous ripple currents generally will not match. The power cell 100 may therefore include a smoothing capacitor 156 across the bus lines 126, 128 to act as a current smoothing filter, to carry the difference ripple current. It will be understood by those having ordinary skill in the art that the smoothing capacitor 156 may be a plurality or bank of capacitors combined in series to condition the output of the SCR arrangement 130. The precise capacitor values may depend upon the power requirements of the inductive load.

The DC power, thus conditioned, can be selectively supplied to output lines 180 and 182 using the PWM method. Pulse-width modulation may be effected using a bridge converter which is composed of semiconductor switches (hereinafter, PWM switches). Such PWM switches are preferred to be power transistors as shown by transistors 162, 164, 166, 168. It is also preferred that transistors 162, 164, 166, 168 be either fully ON or fully OFF as they operate, and not significantly modulate pulse amplitude.

The power transistors 162, 164, 166, 168 are connected in a single-phase H-bridge configuration. To form the H-bridge configuration, the emitter of transistor 162 may be connected to the collector of transistor 166 to form a first transistor pair. Similarly, the emitter of transistor 164 may be connected to the collector of transistor 168 to form a second transistor pair. The first and second transistor pairs are each connected to the DC bus lines 126, 128 with the collectors of transistors 162, 164 being connected to the positive side (bus line 126) and the emitters of transistors 166, 168 being connected to the negative side (bus line 128).

Overvoltage protection of each of transistors 162, 164, 166, 168 may be accomplished by use of anti-parallel diodes 172, 174, 176, 178. In such an arrangement, the cathodes of diodes 172, 174, 176, 178 are connected to the collectors of transistors 162, 164, 166, 168, respectively, and the anodes of diodes 172, 174, 176, 178 are connected to the emitters of transistors 162, 164, 166, 168, respectively. Power transistors 162, 164, 166, 168 may be, for example, bipolar transistors or insulated gate bipolar transistors (IGBTs). Often such transistors include the anti-parallel diodes in one package.

Power, in the form of pulse-width-modulated pulses, is delivered to a first phase output line 180 by a connection between the emitter of transistor 174 and the collector of transistor 178. Likewise, power is delivered to a second phase output line 182 by a connection between the emitter of transistor 162 and the collector of transistor 166.

Transistors 162, 164, 166, 168 may be controlled by a local modulation controller 184, which receives controlling signals from a master controller 80 configured to control multiple power cells 100. The local modulation controller 184 can select either of transistor 162 or 166 to be ON, and either of transistor 164 or 168 to be ON, which will permit power to pass to a load 70 by way of the first phase output line segment 180 or the second phase output line segment 182, respectively.

Figure 3:
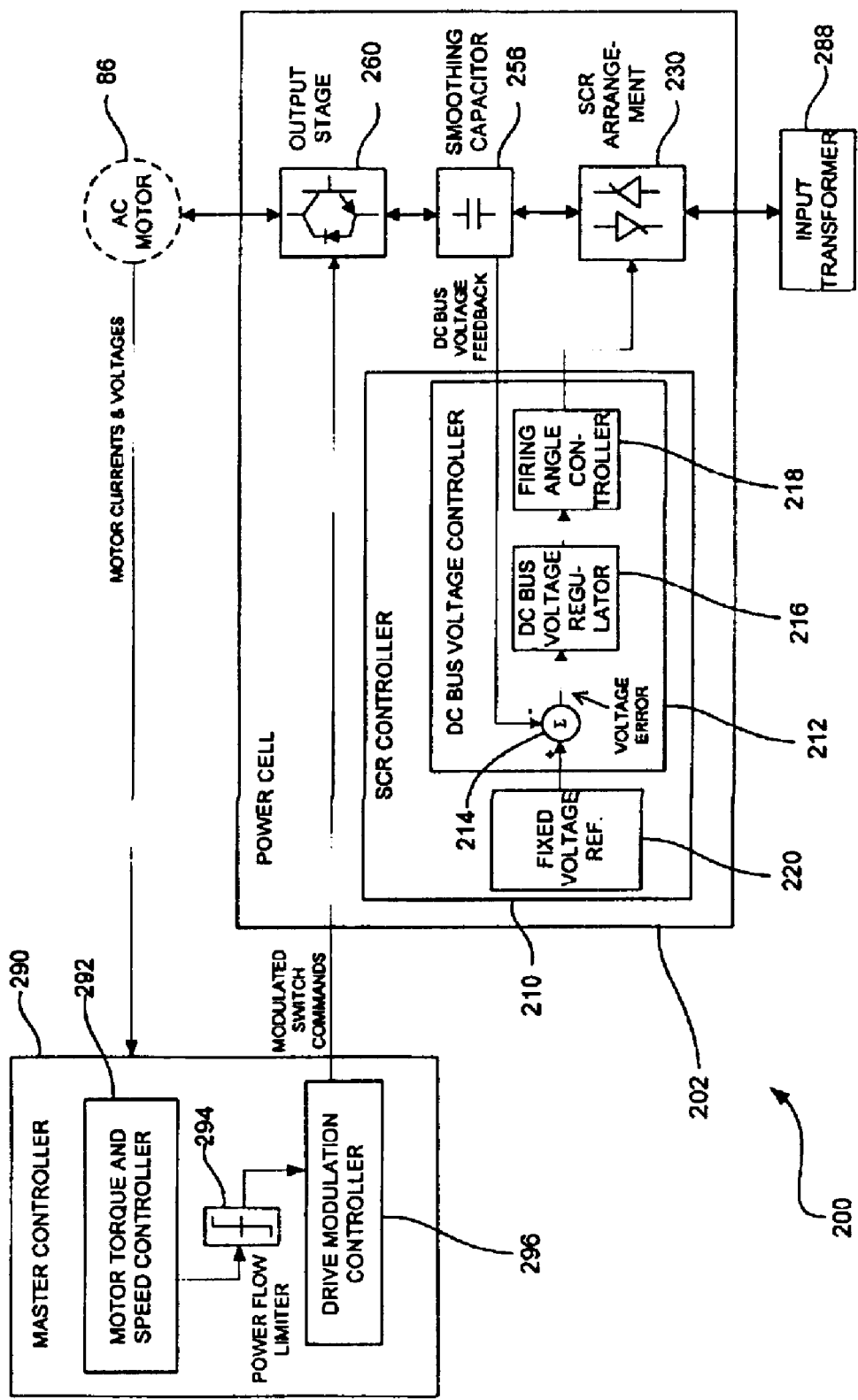
FIG. 3 is a block diagram illustrating a power cell control system according to an embodiment of the invention.

FIG. 3 illustrates a block diagram of a regenerative AC power conversion system 200 according to an aspect of the present invention. The power conversion system 200 includes a master controller 290 configured for modulation control of multiple power cells 202 to provide power to an AC motor 86. The power conversion system 200 further includes an input power transformer 288 that may be configured to receive power from a multiphase AC power source (not shown) and supply it to a plurality of power cells 202. In FIG. 3, only a single power cell 202 is illustrated. It will be understood, however, that the power conversion system 200 may include any number of power cells 202.

The block diagram of FIG. 3 illustrates the features of a particular control methodology that may be used in conjunction with any of the power cells of the present invention. The master controller 290 of the power conversion system 200 includes a motor torque and speed controller 292, a power flow limiter 294 and a drive modulation controller 296. The master controller 290 monitors the currents and voltages in the AC motor 86. The power flow to and from the AC motor 86 is monitored by the motor torque and speed controller 292. When in motoring mode, the drive modulation controller 296 uses modulated switch commands to control the power transistors of the PWM output stage 260 in order to maintain the power flow to the AC motor 86 within the predetermined limits programmed into the power flow limiter 294.

The power cell 202 of the power conversion system 200 includes an SCR arrangement 230, a smoothing capacitor 256 and a PWM output stage 260, all of which may be configured according to the topology of the power cell 100 of FIG. 2. The SCR arrangement 230 is configured to include forward-conducting SCRs that control the DC bus voltage in the motoring mode and reverse-conducting SCRs that control the DC bus voltage in the regenerative operation mode. The power cell 202 includes an SCR controller 210 that includes a DC bus voltage controller 212 configured to monitor the DC bus voltage across the smoothing capacitor 256. The DC bus voltage controller 212 is wired or programmed to include a summing junction 214 that subtracts the DC bus voltage value from a predetermined fixed voltage reference value 220 to determine a bus voltage error. The fixed voltage reference value 220 may be pre-programmed into the SCR controller 210. The output of the summing junction 214 may be filtered using a high pass filter (not shown) to provide a filtered bus voltage error signal. The SCR controller 210 further includes a DC bus voltage regulator 216 which receives the bus voltage error signal and determines if the SCRs of the SCR arrangement 230 should be gated to reduce or increase the DC bus voltage. Responsive to a determination that the DC bus voltage is outside predetermined limits, a signal is sent to a firing angle controller 218 which commands the gating of the appropriate SCRs for reducing or increasing the DC bus voltage.

The use of the forward SCRs in the SCR arrangement serves to control the DC bus voltage in the power cell. This ensures that the DC Bus voltage is never too high to prevent the correct operation of the reverse SCRs in the event of regeneration thereby freeing the master controller 290 from a zero regeneration limit. Accordingly, a non-zero regeneration limit may be enforced by the master controller 290. The new limit may be a function of the capacity of the SCR arrangement to conduct current. Such limits depend on the heatsinks, conductors and SCR packages used to construct the SCR arrangement.

Accordingly, the power conversion system 200 is fully operable in both motoring and regeneration modes. In addition, the power conversion system 200 provides for highly rapid switching from motoring to regeneration and back.

Figure 4:
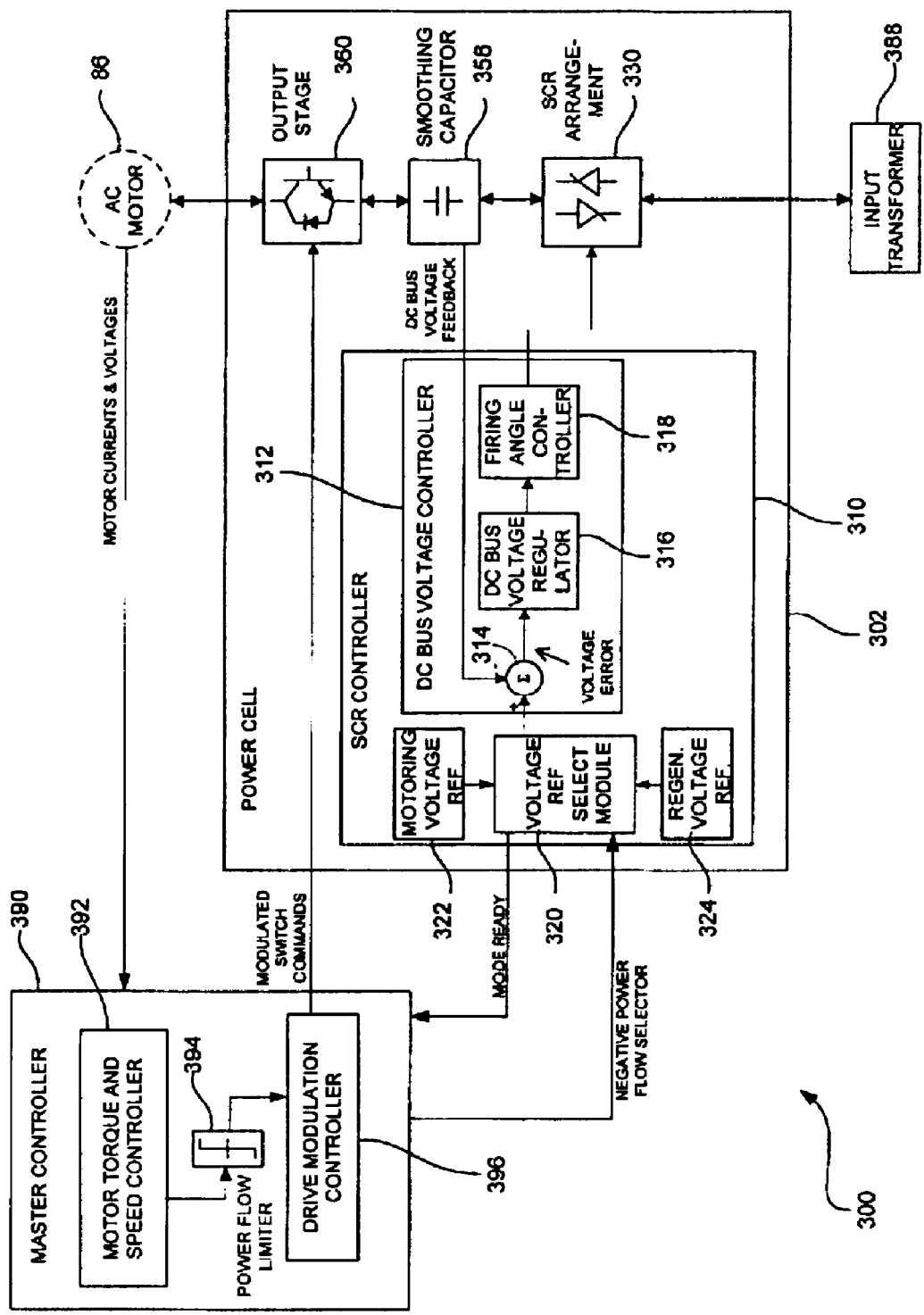
FIG. 4 is a block diagram illustrating a power cell control system according to an embodiment of the invention.

FIG. 4 illustrates a block diagram of a regenerative AC power conversion system 300 according to an aspect of the present invention. The power conversion system 300 includes a master controller 390 configured for modulation control of multiple power cells 302 to provide power to an AC motor 86. The power conversion system 300 further includes an input power transformer 388 that may be configured to receive power from a multiphase AC power source (not shown) and supply it to a plurality of power cells 302. In FIG. 4, only a single power cell 302 is illustrated. It will be understood, however, that the power conversion system 300 may include any number of power cells 302.

The block diagram of FIG. 4 illustrates the features of a particular control methodology that may be used in conjunction with any of the power cells of the present invention. The master controller 390 of the power conversion system 300 includes a motor torque and speed controller 392, a power flow limiter 394 and a drive modulation controller 396. The master controller 390 monitors the currents and voltages in the AC motor 86. The power flow to and from the AC motor 86 is monitored by the motor torque and speed controller 392. When in motoring mode, the drive modulation controller 396 uses modulated switch commands to control the power transistors of the PWM output stage 360 in order to maintain the power flow to the AC motor 86 within the predetermined limits programmed into the power flow limiter 394.

The power cell 302 of the power conversion system 300 includes an SCR arrangement 330, a smoothing capacitor 356 and a PWM output stage 360, all of which may be configured according to the topology of the power cell 100 of FIG. 2. The SCR arrangement 330 is configured to include forward-conducting SCRs that control the DC bus voltage in the motoring mode and reverse-conducting SCRs that control the DC bus voltage in the regenerative operation mode. The power cell 302 includes an SCR controller 310 that includes a DC bus voltage controller 312 configured to monitor the DC bus voltage across the smoothing capacitor 356. The DC bus voltage controller 312 is wired or programmed to include a summing junction 314 that subtracts the DC bus voltage value from a voltage reference value. The voltage reference value is determined by a voltage reference selection module 320 that is in communication with the master controller 390. The voltage reference selection module 320 determines whether to provide a motoring voltage reference value 322 or a regenerative voltage reference value 324 depending on the operating mode of the power conversion system 300. Both the predetermined motoring voltage reference value 322 and a regeneration voltage reference value 324 may be programmed or otherwise stored in the SCR controller 310. The operating mode of the system may be signaled to the voltage reference selection module 320 by the master controller 390. Illustratively, this may take the form of a negative power flow signal to request a change in operating mode in advance of the master controller 390 actually commanding reverse power flow.

Based on the signal from the master controller 390, the voltage reference selection module 320 selects the proper voltage reference and provides it to the summing junction 314. The DC bus voltage is then subtracted from the voltage reference to determine the bus voltage error. The output of the summing junction 314 may be filtered using a high pass filter (not shown) to provide a filtered bus voltage error signal. The SCR controller 310 further includes a DC bus voltage regulator 316 which receives the bus voltage error signal and determines if the SCRs of the SCR arrangement 330 should be gated to reduce or increase the DC bus voltage. Responsive to a determination that the DC bus voltage is outside predetermined limits, a signal is sent to a firing angle controller 318 which commands the gating of the appropriate SCRs for reducing or increasing the DC bus voltage. When the voltage error signal has been reduced to an acceptable level, a mode ready signal may be sent to the master controller 390 to indicate it is safe to proceed with regenerative power flow (i.e., change the negative power flow limit value used by the power flow limiter 394).

As in the previous embodiment, the use of the forward SCRs in the SCR arrangement 330 serves to control the DC bus voltage in the power cell 302 during regeneration. This prevents an overvoltage situation from developing that would prevent the correct operation of the reverse-conducting SCRs.

Figure 5:
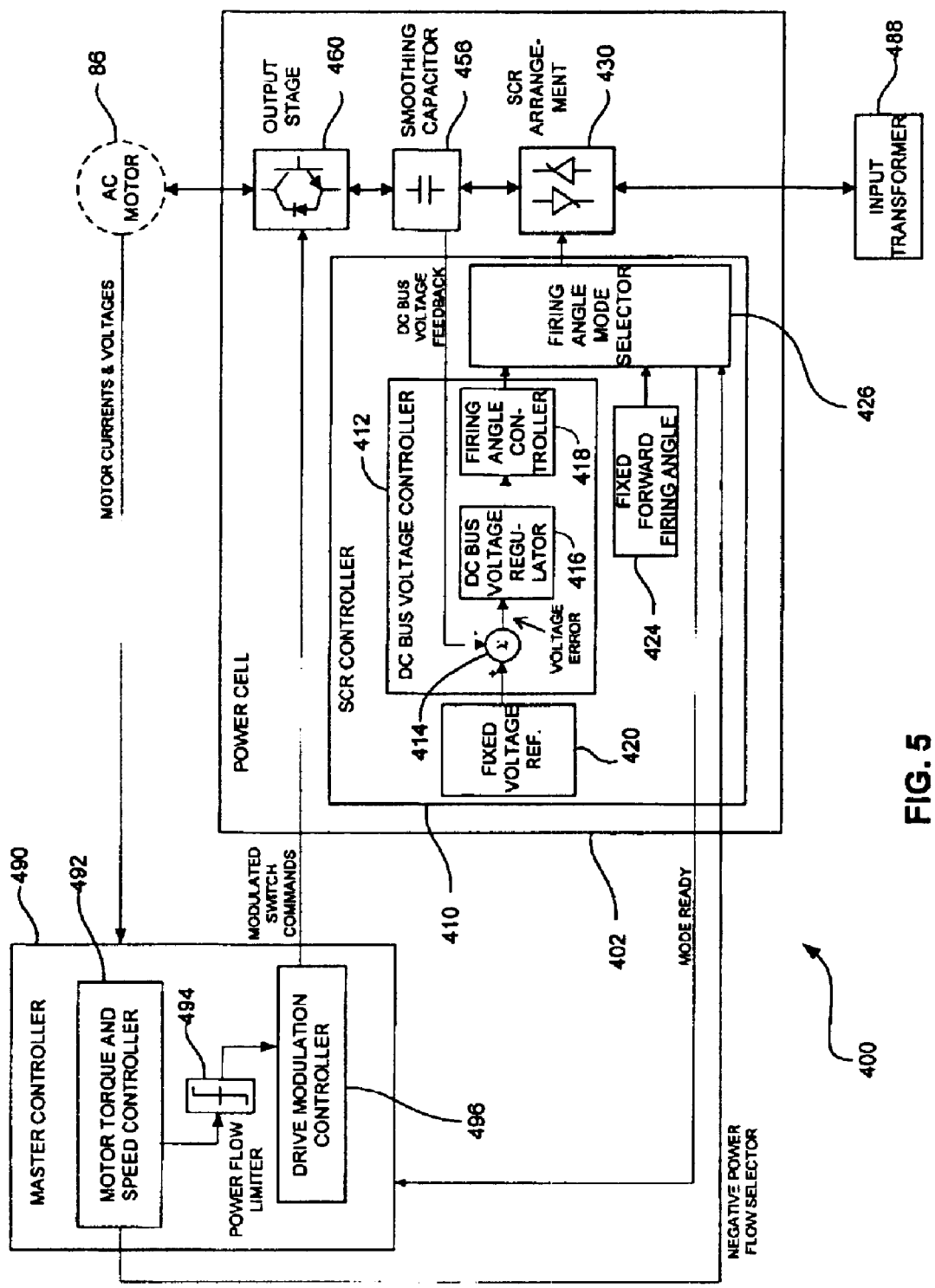
FIG. 5 is a block diagram illustrating a power cell control system according to an embodiment of the invention.

FIG. 5 illustrates a block diagram of a regenerative AC power conversion system 400 according to an aspect of the present invention. The power conversion system 400 includes a master controller 490 configured for modulation control of multiple power cells 402 to provide power to an AC motor 86. The power conversion system 400 further includes an input power transformer 488 that may be configured to receive power from a multiphase AC power source (not shown) and supply it to a plurality of power cells 402. In FIG. 5, only a single power cell 402 is illustrated. It will be understood, however, that the power conversion system 400 may include any number of power cells 402.

The block diagram of FIG. 5 illustrates the features of a particular control methodology that may be used in conjunction with any of the power cells of the present invention. The master controller 490 of the power conversion system 400 includes a motor torque and speed controller 492, a power flow limiter 494 and a drive modulation controller 496. The master controller 490 monitors the currents and voltages in the AC motor 86. The power flow to and from the AC motor 86 is monitored by the motor torque and speed controller 492. When in motoring mode, the drive modulation controller 496 uses modulated switch commands to control the power transistors of the PWM output stage 460 in order to maintain the power flow to the AC motor 86 within the predetermined limits programmed into the power flow limiter 494.

The power cell 402 of the power conversion system 400 includes an SCR arrangement 430, a smoothing capacitor 456 and a PWM output stage 460, all of which may be configured according to the topology of the power cell 100 of FIG. 2. The SCR arrangement 430 is configured to include forward-conducting SCRs that control the DC bus voltage in the motoring mode and reverse-conducting SCRs that control the DC bus voltage in the regenerative operation mode.

The control methodology used in the power conversion system 400 differs significantly from that of the previous embodiments in that the firing control of the SCRs of the SCR arrangement 430 is a direct function of the operating mode of the power conversion system 400. As before, the power cell 402 includes an SCR controller 410 that includes a DC bus voltage controller 412 configured to monitor the DC bus voltage across the smoothing capacitor 456. As in the power conversion system 200 of FIG. 3, the DC bus voltage controller 412 is wired or programmed to include a summing junction 414 that subtracts the DC bus voltage value from a predetermined fixed voltage reference value 420 to determine a bus voltage error. The fixed voltage reference value 420 may be pre-programmed into the SCR controller 410. The output of the summing junction 414 may be filtered using a high pass filter (not shown) to provide a filtered bus voltage error signal. The DC bus voltage controller 412 further includes a DC bus voltage regulator 416 which receives the bus voltage error signal and determines whether the voltage error signal is within predetermined limits. Responsive to a determination that the DC bus voltage is outside predetermined limits, a signal is sent to a firing angle controller 418, which determines a first possible firing angle command. A second possible firing angle command may be provided as a predetermined fixed forward firing angle 424 programmed or otherwise stored in the SCR controller 410.

The SCR controller 410 includes a firing angle mode selector 426 in communication with the firing angle controller 418 and the master controller 490. The firing angle mode selector 418 is configured to select one of the first and second firing angle commands depending on the operating mode of the conversion system 400 as communicated to the firing angle mode selector 426 by the master controller 490. The selected command is then sent to the SCR arrangement 430. In a typical usage scenario, the firing angle mode selector 426 selects the fixed forward firing angle when the power conversion system 400 is in the motoring mode. This has the effect of essentially turning the forward SCRs into diodes. When the master controller 490 detects that regeneration is required, it signals the firing angle mode selector 426 to switch to regeneration mode, in which the firing angle mode selector 426 selects the firing angle command output from the DC bus voltage controller 412. The bus voltage controller command is then used to command the SCRs of the SCR arrangement 430 to control the DC bus voltage level in a manner similar to that of the previous embodiments. A mode ready signal may be used to signal the master controller 490 that the voltage error signal is within acceptable limits for changing operation modes.

The performance of the power conversion system 400 is similar to that of the power conversion system 300 of FIG. 4. As in the previous embodiments, the power conversion system 400 is fully operable in both motoring and regeneration modes. Like the power conversion system 300, the power conversion system 400 has the advantage of providing flexibility in the voltage reference used for different operating modes, which can provide a significantly better power factor during motoring operation.

Embodiments of the present invention provide AC motor drives that combine the advantages of PWM motoring operation with the advantages of regeneration through the use of SCRs that control the DC bus voltage experienced during both modes of operation. It will, however, be understood by those having ordinary skill in the art that the present invention encompasses power converter embodiments that make use of a power cell configured for motoring only. These embodiments would require only forward-conducting SCRs, which would control the DC bus voltage of the power cells in the manner previously described for the motoring mode. Significantly, the present invention provides a power cell with SCRs that may be controlled substantially independently of the of the PWM output stage of the power cell.

Although the foregoing description includes numerous details, it will be appreciated that these details have been included solely for the purpose of explaining specific embodiments of the invention. Numerous and significant variations of the details provided above will be readily apparent to persons skilled in the art which will remain within the scope and spirit of the invention, as defined by the following claims and their legal equivalents.

What is claimed is:

1. A power conversion system for driving a load, the power conversion system comprising:
   a power transformer having at least one primary winding circuit and at least one secondary winding circuit, the primary winding circuit being electrically connectable to an AC power source;
   at least one power cell, each of the at least one power cell having a power cell input connected to a respective one of the at least one secondary winding circuit, a single phase output connectable to the load, an SCR arrangement including a gate drive and at least one SCR connected to the power cell input and a DC bus, an SCR controller connected to the SCR arrangement and the power cell input, a PWM output stage having a plurality of PWM switches connected to the DC bus and the single phase output, and a local modulation controller connected to the PWM output stage, wherein the SCR arrangement and the SCR controller are configured for controlling a DC bus voltage, the PWM switches are configured for controlling power flow to the single phase output, and the local modulation controller is configured for controlling activation of the PWM power switches; and
   a master controller in communication with the SCR controller and the local modulation controller of each of the at least one power cell, the master controller being connectable to the load to monitor power flow thereto,
   wherein the SCR controller includes a DC bus voltage controller connected to the DC bus, the DC bus voltage controller including a summing junction configured for determining a voltage error between the DC bus voltage and a voltage reference, a DC bus voltage regulator in communication with the summing junction, and a firing angle controller in communication with the DC bus voltage regulator.

2. A power conversion system according to claim 1 wherein the SCR controller further includes a voltage reference select module in communication with the summing junction and the master controller.

3. A power conversion system according to claim 1 wherein the firing angle controller is in communication with the SCR arrangement.

4. A power conversion system according to claim 1 wherein the SCR controller further includes a firing angle mode selector in communication with the firing angle controller, the master controller and the SCR arrangement.

5. A power conversion system for driving a load, the power conversion system comprising:
   a multiphase power transformer having at least one primary winding circuit and at least one secondary winding circuit, the primary winding circuit being electrically connectable to a multiphase AC power source;
   at least one power cell, each of the at least one power cell having a power cell input connected to a respective one of the at least one secondary winding circuit, a single phase output connectable to the load, an SCR arrangement including a gate drive and a plurality of SCRs connected to the power cell input and a DC bus, an SCR controller connected to the SCR arrangement and the power cell input, a PWM output stage having a plurality of PWM switches connected to the DC bus and the single phase output, and a local modulation controller connected to the PWM output stage, wherein the SCR arrangement and the SCR controller are configured for controlling a DC bus voltage, the PWM switches are configured for controlling power flow to the single phase output, and the local modulation controller is configured for controlling activation of the PWM power switches; and
   a master controller in communication with the SCR controller and the local modulation controller of each of the at least one power cell, the master controller being connectable to the load to monitor power flow to and from the load,
   wherein the SCR controller includes a DC bus voltage controller connected to the DC bus, the DC bus voltage controller including a summing junction configured for determining a voltage error between the DC bus voltage and a voltage reference, a DC bus voltage regulator in communication with the summing junction, and a firing angle controller in communication with the DC bus voltage regulator.

6. A power conversion system according to claim 5 wherein the SCR controller further includes a voltage reference select module in communication with the summing junction and the master controller.

7. A power conversion system according to claim 5 wherein the firing angle controller is in communication with the SCR arrangement.

8. A power conversion system according to claim 5 wherein the SCR controller further includes a firing angle mode selector in communication with the firing angle controller, the master controller and the SCR arrangement.

9. A power conversion system for driving a load, the power conversion system comprising:
   a power transformer having at least one primary winding circuit and at least one secondary winding circuit, the primary winding circuit being electrically connectable to an AC power source;
   at least one power cell, each of the at least one power cell having a power cell circuit with a power cell input connected to a respective one of the at least one secondary winding circuit, a DC bus and a single phase output connectable to the load;
   an SCR arrangement in the power cell circuit of each of the at least one power cell, the SCR arrangement including a gate drive, at least one forward-conducting SCR connected to the power cell input and at least one reverse-conducting SCR connected to the power cell input and the DC bus;
   an SCR controller associated with each of the at least one power cell, the SCR controller being connected to the SCR arrangement and the power cell input, the SCR controller including a DC bus voltage controller connected to the DC bus, the DC bus voltage controller including a summing junction configured for determining a voltage error between the DC bus voltage and a voltage reference, a DC bus voltage regulator in communication with the summing junction, and a firing angle controller in communication with the DC bus voltage regulator;

a PWM output stage in the power cell circuit of each of the at least one power cell, the PWM output stage having a plurality of PWM switches connected to the DC bus and the single phase output;

a local modulation controller associated with each of the at least one power cell, the local modulation controller being connected to the PWM output stage; and a master controller in communication with the SCR controller and the local modulation controller of each of the at least one power cell, the master controller being connectable to the load to monitor power flow thereto.

10. A power conversion system according to claim 9 wherein the SCR controller further includes a voltage reference select module in communication with the summing junction and the master controller.

11. A power conversion system according to claim 9 wherein the SCR controller further includes a firing angle mode selector in communication with the firing angle controller, the master controller and the SCR arrangement.

12. A power conversion system for driving a load, the power conversion system comprising:

a power transformer having at least one primary winding circuit and at least one secondary winding circuit, the primary winding circuit being electrically connectable to an AC power source;

at least one power cell, each of the at least one power cell having a power cell circuit with a power cell input connected to a respective one of the at least one secondary winding circuit, a DC bus and a single phase output connectable to the load;

an SCR arrangement in the power cell circuit of each of the at least one power cell, the SCR arrangement including a gate drive, at least one forward-conducting SCR connected to the power cell input and the DC bus and at least one reverse-conducting SCR connected to the power cell input and the DC bus;

an SCR controller associated with each of the at least one power cell, the SCR controller being connected to the SCR arrangement and the power cell input and having a DC bus voltage controller connected to the DC bus, the DC bus voltage controller including a summing junction configured for determining a voltage error between a DC bus voltage and a voltage reference, a DC bus voltage regulator in communication with the summing junction, and a firing angle controller in communication with the DC bus voltage regulator and in selective communication with the SCR arrangement;

a PWM output stage in the power cell circuit of each of the at least one power cell, the PWM output stage having a plurality of PWM switches connected to the DC bus and the single phase output;

a local modulation controller associated with each of the at least one power cell, the local modulation controller being connected to the PWM output stage; and a master controller in communication with the SCR controller and the local modulation controller of each of the at least one power cell, the master controller being connectable to the load to monitor power flow thereto.

13. A power conversion system according to claim 12 wherein the at least one power cell is operable in a motoring mode in which power from the AC power source is supplied to the load by the at least one power cell and a regeneration mode in which power from the load is supplied to the AC power source by the at least one power cell.

14. A power conversion system according to claim 12 wherein the master controller is configured to control transition of the at least one power cell from the motoring mode to the regeneration mode and from the regeneration mode to the motoring mode using commands to at least one of the SCR controller and the local modulation controller.

15. A power conversion system according to claim 13 wherein the SCR controller further includes a voltage reference select module in communication with the summing junction and the master controller.

16. A power conversion system according to claim 12 wherein the SCR controller further includes a firing angle mode selector in communication with the firing angle controller, the master controller and the SCR arrangement.

17. A power conversion system according to claim 12 wherein the power cell circuit includes a smoothing capacitor connected across the DC bus intermediate the SCR arrangement and the PWM output stage.

18. A power cell for use in a power conversion system, the power cell comprising:

a power cell input connectable to a secondary winding of a power transformer;

a single phase output connectable to a load;

an SCR arrangement including a gate drive and at least one SCR connected to the power cell input;

an SCR controller connected to the SCR arrangement and the power cell input;

a DC bus connected to the SCR arrangement, the SCR arrangement and the SCR controller being configured for controlling a DC bus voltage;

a PWM output stage having a plurality of PWM switches connected to the DC bus and the single phase output, the PWM switches being configured for controlling power flow to the single phase output; and a local modulation controller connected to the PWM output stage, the local modulation controller being configured for controlling activation of the PWM power switches, wherein the SCR controller includes a DC bus voltage controller connected to the DC bus, the DC bus voltage controller including a summing junction configured for determining a voltage error between the DC bus voltage and a voltage reference, a DC bus voltage regulator in communication with the summing junction, and a firing angle controller in communication with the DC bus voltage regulator.

19. A power cell according to claim 18 wherein the SCR controller further includes a voltage reference select module that is in communication with the summing junction and is connectable to a master controller.

20. A power cell according to claim 18 wherein the firing angle controller is in communication with the SCR arrangement.

21. A power cell according to claim 18 wherein the SCR controller further includes a firing angle mode selector in communication with the firing angle controller and the SCR arrangement, the firing angle mode selector being connectable to a master controller.

22. A power cell for use in a power conversion system, the power cell comprising:
- a power cell input connectable to a secondary winding of a power transformer;
- a single phase output connectable to a load;
- an SCR arrangement including a gate drive and at least one forward-conducting SCR connected to the power cell input and a DC bus and at least one reverse-conducting SCR connected to the power cell input and the DC bus, the SCR arrangement being configured for controlling a DC bus voltage;
- an SCR controller connected to the SCR arrangement and the power cell input, the SCR controller including a DC bus voltage controller connected to the DC bus, the DC bus voltage controller including a summing junction configured for determining a voltage error between the DC bus voltage and a voltage reference, a DC bus voltage regulator in communication with the summing junction, and a firing angle controller in communication with the DC bus voltage regulator and in selective communication with the SCR arrangement;
- a PWM output stage having a plurality of PWM switches connected to the DC bus and the single phase output, the PWM switches being configured for controlling power flow to the single phase output; and
- a local modulation controller connected to the PWM output stage, the local modulation controller being configured for controlling activation of the PWM power switches.

23. A power cell according to claim 22 wherein the power cell is operable in a motoring mode in which power from an AC power source is supplied to a load by the power cell and a regeneration mode in which power from the load is supplied to the AC power source by the power cell.

24. A power cell according to claim 23 wherein the local modulation controller and the SCR controller are connectable to a master controller configured to control transition of the power cell from the motoring mode to the regeneration mode and from the regeneration mode to the motoring mode using commands to at least one of the SCR controller and the local modulation controller.

25. A power cell according to claim 22 wherein the SCR controller further includes a firing angle mode selector in communication with the firing angle controller and the SCR arrangement, the firing angle mode selector being connectable to a master controller.

26. A power cell according to claim 22 wherein the power cell includes a smoothing capacitor connected across the DC bus intermediate the SCR arrangement and the PWM output stage.

27. A method of controlling a supply of AC power to a load, the method comprising:
- receiving an input voltage in a power cell circuit having a power cell input, a single phase output connected to the load, an SCR arrangement having at least one SCR connected to the power cell input, a DC bus connected to the SCR arrangement and a PWM output stage having a plurality of PWM switches connected to the DC bus and the single phase output;
- selectively controlling the DC bus voltage using the SCR arrangement; and
- applying power to the load by selectively activating at least one of the PWM power switches to allow current to flow through the single phase output to the load,
- wherein the step of selectively controlling a DC bus voltage includes: determining an updated firing angle for the at least one SCR; and gating the at least one SCR using the updated firing angle.

28. A method according to claim 27 wherein the step of determining an updated firing angle includes:
- determining the DC bus voltage;
- determining a voltage error by finding a difference between the DC bus voltage and a reference voltage;
- comparing the voltage error to a predetermined limit set; and
- responsive to the voltage error being outside the predetermined limit set, computing an updated firing angle for the at least one SCR of the SCR arrangement.

* * * * *